(12) United States Patent
Giancola et al.

(10) Patent No.: US 6,891,362 B2
(45) Date of Patent: May 10, 2005

(54) METHOD AND APPARATUS FOR ESTIMATING THE PHASE OF A SIGNAL

(75) Inventors: Diego Giancola, Cambridge (GB); Bhimantoro Y Prasetyo, Cambridge (GB)

(73) Assignee: Analog Devices B.V. (IE)

( * ) Notice: Subject to any disclaimer, the term of this patent is extended or adjusted under 35 U.S.C. 154(b) by 0 days.

(21) Appl. No.: 10/432,319
(22) PCT Filed: Nov. 19, 2001
(86) PCT No.: PCT/GB01/05095
§ 371 (c)(1), (2), (4) Date: May 21, 2003
(87) PCT Pub. No.: WO02/42782
PCT Pub. Date: May 30, 2002

(65) Prior Publication Data
US 2004/0032245 A1 Feb. 19, 2004

(30) Foreign Application Priority Data
Nov. 21, 2000 (GB) .............................. 0028373

(51) Int. Cl.[7] .................. H03D 13/00; G01R 25/00; G01R 29/02
(52) U.S. Cl. .................. 324/76.77; 324/86; 702/72
(58) Field of Search .................. 324/76.77, 76.78, 324/76.74, 86; 702/66, 69, 70, 72, 73, 74, 189; 331/25; 329/304

(56) References Cited

U.S. PATENT DOCUMENTS

| | | | |
|---|---|---|---|
| 3,691,474 A | * 9/1972 | Calaway | 331/1 A |
| 4,607,218 A | 8/1986 | Stoesel | 324/76.82 |
| 5,787,124 A | 7/1998 | Shimura | 375/328 |
| 5,856,920 A | 1/1999 | Buda et al. | 363/149 |
| 6,128,584 A | * 10/2000 | Hemminger et al. | 702/75 |
| 6,636,570 B1 | * 10/2003 | Choi et al. | 375/332 |

FOREIGN PATENT DOCUMENTS

WO    WO 99/18691    4/1999

* cited by examiner

Primary Examiner—N. Le
Assistant Examiner—Jeff Natalini
(74) Attorney, Agent, or Firm—Kilpatrick Stockton LLP

(57) ABSTRACT

An input signal is a complex vector whose phase is a coherent measurement of the phase rotation occurring between two separated symbols of a received CDMA signal. A processing block (30) provides a first signal showing the magnitude and the sign of the imaginary part of the input signal, and a second signal showing the magnitude and sign of the real part of the input signal to an initialisation block (31). A quadrant determination block (32) examines the signs of the signals to determine the quadrant in which the phase of the input signal exists. A comparator block (33) determines if the magnitude of the first signal is greater than or equal to the magnitude of the second signal. If a negative determination is made, the magnitude of the first signal is doubled in a multiplication block (35) to form a multiplied signal, and a counter incremented, initially from zero. The comparator block (33) then determines if the multiplied signal is greater than or equal to the magnitude of the second signal. This continues until the multiplied signal is equal to or exceeds the magnitude of the second signal. Carried to an upscaling block (36) is the multiplied signal (or the first signal if there is no multiplied signal), the magnitude of the second signal and the count of the counter (M). The upscaling block (36) examines the multiplied signal (or the first signal) and determines an upscaling factor. The multiplied signal (or the first signal) is multiplied by the scaling factor, as is the second signal, and the upscaled signals are provided to an angle determination block (34). The phase error $\theta_e$ in degrees is estimated by the formula $\theta_e = 45°/2^M$.

12 Claims, 3 Drawing Sheets

ND APPARATUS FOR
METHOD AND APPARATUS FOR ESTIMATING THE PHASE OF A SIGNAL

FIELD OF THE INVENTION

This invention relates to a method for estimating the phase of a signal of interest, and to apparatus for estimating the phase of a signal of interest.

SUMMARY OF THE INVENTION

In accordance with a first aspect of this invention, there is provided a method of estimating the phase rotation of a signal of interest from first and second signals, the method comprising:

a) determining whether a predetermined relationship exists between the magnitudes of the first and second signals;

b) if the predetermined relationship is determined to exist, moving to step g);

c) if the predetermined relationship does not exist, multiplying the first signal by a predetermined scaling factor to produce a multiplied signal;

d) determining whether the predetermined relationship exists between the multiplied signal and the second signal;

e) if the predetermined relationship does not exist between the multiplied signal and the second signal, multiplying the multiplied signal by the predetermined scaling factor;

f) repeating steps d) and e) until the predetermined relationship exists;

g) determining on how many occasions a signal was multiplied before the predetermined relationship came to exist; and h) estimating the phase rotation using the number of occasions of multiplication so determined.

In accordance with a second aspect of this invention, there is provided apparatus for estimating the phase rotation of a signal of interest from first and second signals, the apparatus comprising:

means for determining whether a predetermined relationship exists between the magnitudes of the first and second signals;

means for, if the predetermined relationship does not exist, multiplying the first signal by a predetermined scaling factor to produce a multiplied signal;

means for determining whether the predetermined relationship exists between the multiplied signal and the second signal;

means for, if the predetermined relationship does not exist between the multiplied signal and the second signal, repeatedly multiplying the multiplied signal by the predetermined scaling factor until the predetermined relationship exists;

means for determining on how many occasions a signal was multiplied before the predetermined relationship came to exist, and means responsive to the number of occasions of multiplication so determined for estimating the phase rotation.

This invention allows frequency error mitigation to be accomplished without the extensive use of fixed point calculations and without using floating point calculations.

Embodiments of the present invention will now be described, by way of example only, with reference to the accompanying drawings, in which:

DETAILED DESCRIPTION OF THE INVENTION

Figure 1:
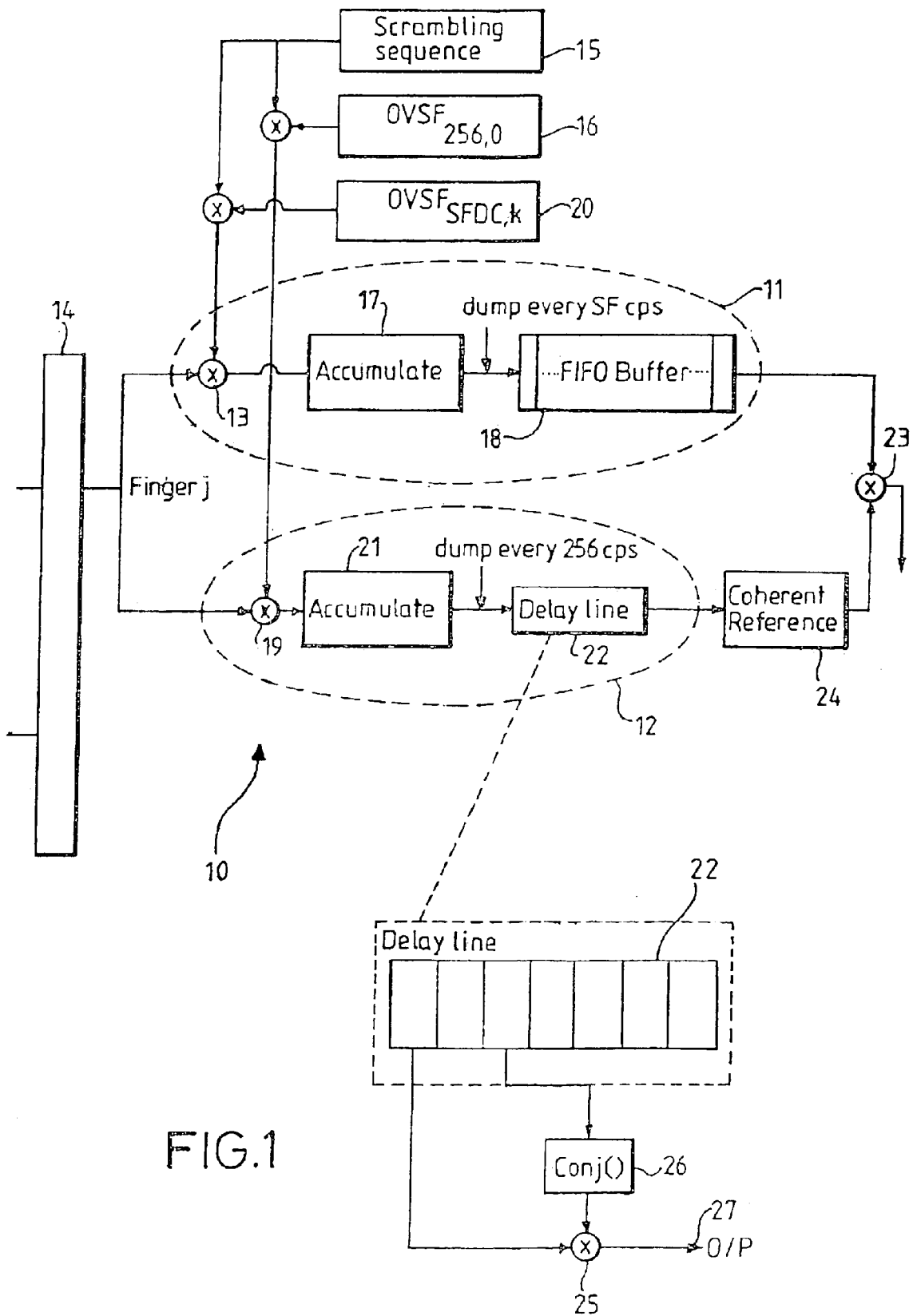
FIG. 1 shows schematically part of a finger of a rake receiver to which the invention is applied.

A finger 10 of a rake receiver to which the invention is applied is shown in FIG. 1. Referring to FIG. 1, the finger 10 comprises generally a traffic channel 11 and a pilot channel 12. A mixer 13 in the traffic channel 11 mixes an input signal, received from a schematic delay line 14, with a code provided by a scrambling code generator 15 and with a traffic channel specific code provided by a first OVSF (orthogonal variable spreading factor) code generator 16. The resultant signal is fed to a first accumulator 17 and to a first-in-first-out (FIFO) buffer 18, in a conventional manner. In the pilot channel 12, the input signal is mixed, in a second mixer 19, with the code provided by the scrambling code generator 15 and with a pilot channel specific code, generated by a second OVSF code generator 20. This mixed signal is then accumulated in a second accumulator 21 over a period of time equal to 256 chips, or one symbol, of the scrambling code before being reset. The reset period of the second accumulator is aligned with reset period of the OVSF code provided by the first OVSF code generator 16. The resultant complex signals are fed to a second delay line 22 and, from there, to a complex multiplier 23 via a coherent phase reference device 24. The complex multiplier 23 multiplies the output signals from the traffic channel 11 and the pilot channel 12, the result being provided to a coherent combiner (not shown) along with signals from other fingers (not shown) of the rake receiver.

The code generators 15, 16 and 20 are symbol locked with each other and run at code rate.

The complex value at a location P(n) in the second delay line 22 is provided to a first input of a multiplier 25. The conjugate of a complex value at another location P(n+k) in the second delay line 22 is calculated by a conjugate calculation device 26, and the result provided a second input of the multiplier 25. The multiplier 25 multiplies the two complex numbers it receives, and provides the resulting complex number at an output 27. Initially, the value of k is set to 2, the location P(n) then corresponding to an accumulation result two symbols subsequent to the location P(n+2). The second delay line 22 operates in a rolling manner such that, when another accumulation result is provided by the second accumulator 21, this is fed through the second delay line and the multiplier 25 is then fed with signals from subsequent locations in the second delay line. A new complex number output is, therefore, provided every symbol.

The complex number output is a complex vector whose phase is a coherent measurement of the phase rotation occurring between the symbols corresponding to the locations P(n) and P(n+k). The magnitude of the complex vector is proportional to the average power of the accumulation results from those two symbols.

Figure 2:
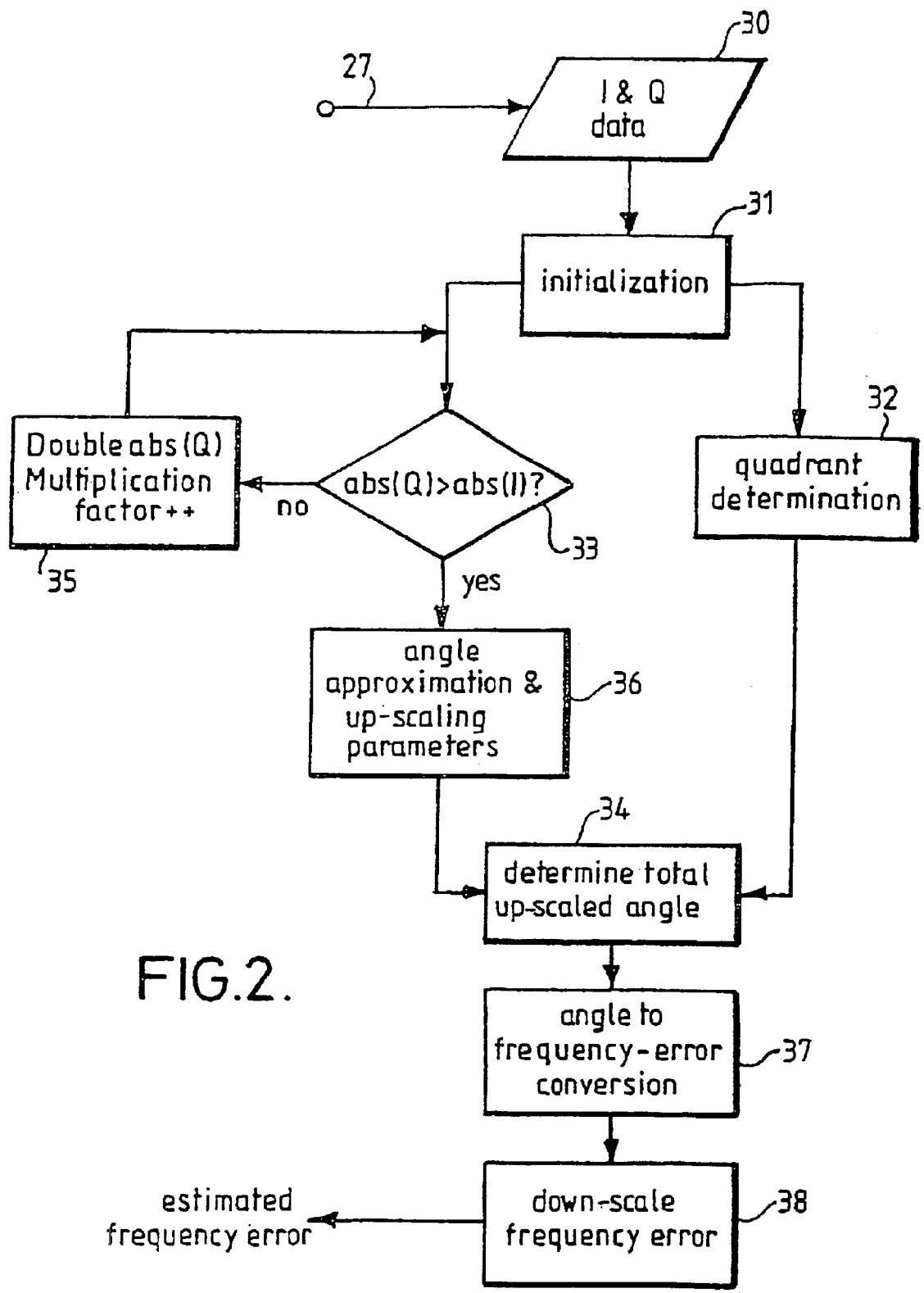
FIG. 2 shows a flow diagram of a mathematical operation used to determine a frequency error in accordance with the invention.

Referring now to FIG. 2, the complex number provided by the multiplier is received at a processing block 30, which provides a first signal which is a 32 bit binary number showing the magnitude and the sign of the imaginary part of the output signal of the multiplier 25, and a second signal which is a 32 bit binary number showing the magnitude and sign of the real part of the output signal of the multiplier. These first and second signals are passed to an initialisation block 31, from where they are passed both to a quadrant determination block 32 and to a comparator block 33. The quadrant determination block 32 examines the signs of the first and second signals to determine the quadrant in which the phase of the input signal exists, and provides the result to an angle determination block 34.

The comparator block 33 determines if the magnitude of the first signal is greater than or equal to the magnitude of the second signal. If a negative determination is made, the magnitude of the first signal is doubled in a multiplication block 35 to form a multiplied signal, and a counter incremented from zero to one. Doubling is effected by a single leftwards bit shift of the first signal and by filling the last significant bit with a 'zero'. The comparator block 33 then determines if the multiplied signal is greater than or equal to the magnitude of the second signal. If a negative determination is again made, the multiplied signal is doubled in the multiplication block to provide a revised multiplied signal, and the counter is again incremented. This process continues until the multiplied signal is equal to or exceeds the magnitude of the second signal, when progression is made to an upscaling block 36. The information carried to the upscaling block 36 is the multiplied signal (or the first signal if there is no multiplied signal), the magnitude of the second signal and the count of the counter. The count of the counter can be considered to be a multiplication factor. If the magnitude of the first signal was equal to or greater than the magnitude of the second signal i.e. no multiplied signals were calculated, the multiplication factor is zero.

The upscaling block 36 examines the multiplied signal or the first signal, as the case may be, and determines how much the signal can be upscaled before it would exceed the limit imposed by the 32 bits assigned to accommodate the signals. The degree of upscaling so determined is hereafter termed the upscaling factor. The multiplied signal or the first signal, as the case may be, is multiplied by the scaling factor, as is the second signal, and the upscaled signals are provided to the angle determination block 34.

The phase error $\theta_e$ in degrees, is then estimated by the following formula:

$$\theta_e = 45°/2^M$$

where M is the count of the counter.

Figure 3:
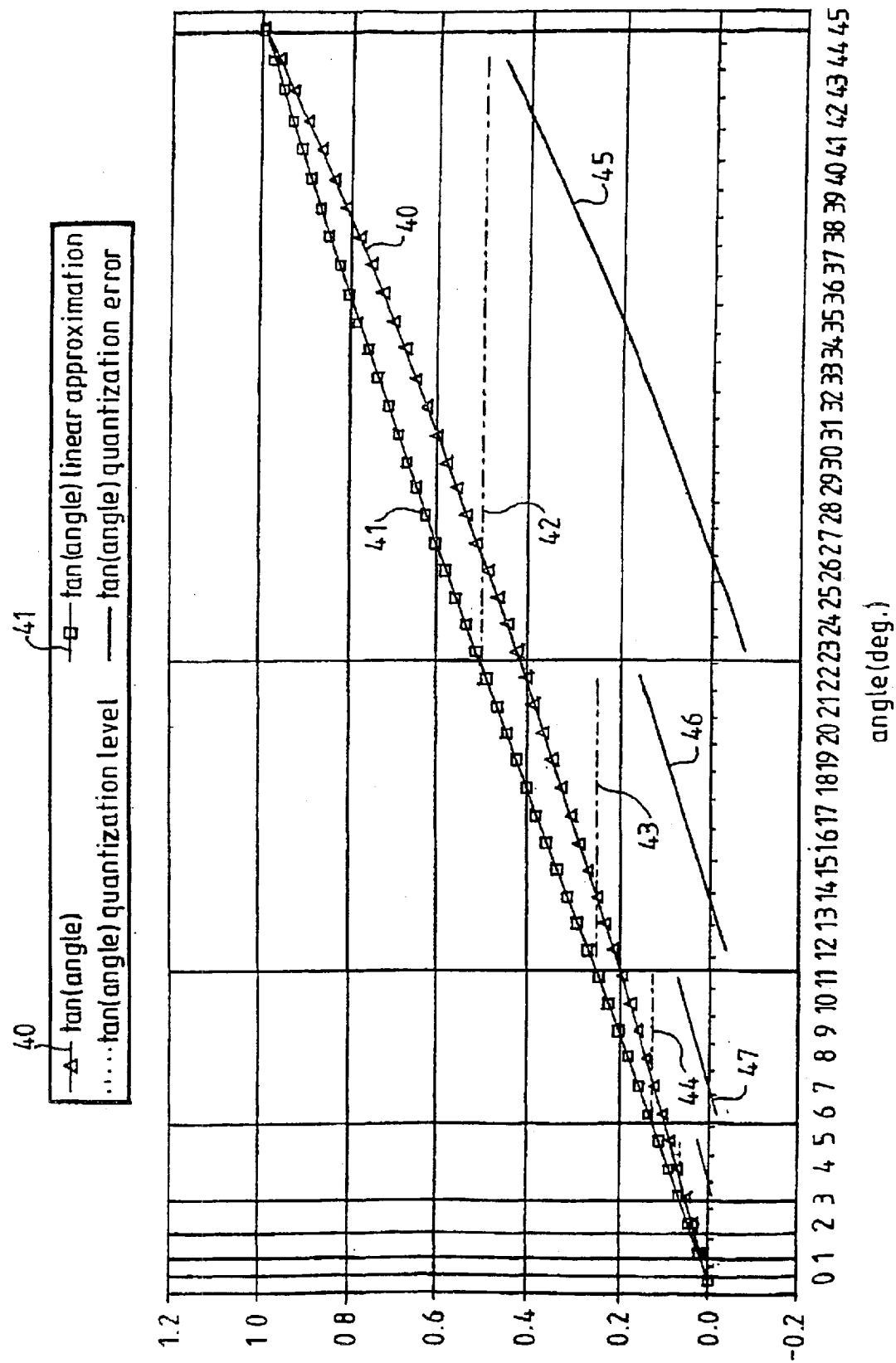
FIG. 3 shows the phase error obtained using the FIG. 2 mathematical operation.

FIG. 3 shows how this estimated phase error differs from the actual phase error. Referring to FIG. 3, the tan of the phase 40, which is indicative of the true phase error, is shown next to a linear approximation 41 thereof. The quantisation levels 42–44 result from the doubling and comparing effected by the multiplication block 35 and the comparing block 33. The difference between the phase error obtained using the above formula and the actual phase error is shown at 45–47.

Referring again to FIG. 2, the calculated phase error is fed to an angle-to-frequency error conversion block 37, where a (possibly upscaled) frequency error $f_e$ is calculated using the following formula:

$$fe = \frac{\theta e}{2\pi(Tm/C)}$$

Where $\theta_e$ is the calculated phase error, $T_m$ is the measurement period in chips (initially 512 chips), and C is the chip rate. The frequency error $f_e$ is rounded down to the nearest integer.

This frequency error $f_e$ is then downscaled by dividing it by the upscaling factor in a downscaling block 38, and the resulting frequency error provided at an output. The frequency error is fed back to control the frequency of an oscillator (not shown) forming part of the rake receiver. The upscaling and subsequent downscaling results in improved accuracy of frequency error estimation since it reduces quantisation noise.

The downscaling block 38 is arranged such that it does not provide a frequency error signal which corresponds to a phase error in the region of −1° to +1°. If such a frequency error would be provided, the frequency error signal is increased incrementally until this criteria is met. Accordingly, once approximate convergence of the frequency of the received signals with the downconversion frequency effected in the rake receiver is reached, the error swings from one side of the true frequency to the other side, and so on.

Once convergence is reached, the value of k is increased, so that the multiplier 25 receives signals which correspond to accumulation results spaced further apart in time. This allows more accurate phase, and therefore frequency, error signals to be calculated.

This invention allows a phase error, and therefore a frequency error, signal to be provided with relatively few fixed-point operations and with no floating-point operations. The apparatus required is, therefore, of simpler construction than conventional digital phase and frequency error estimation apparatus. The resultant frequency error signals are not, however, as accurate as those obtained conventionally, but the inventors see this as a disadvantage which is acceptable in view of the advantages obtained. The invention can be used both with acquisition and with tracking of the carrier of received signals, and is not limited to use with code division multiple access receivers.

Although the invention has been described with the multiplication block providing a doubling function, other scaling factors are possible, such as four and eight, although larger scaling factors result in decreased accuracy.

What is claimed is:

1. A method of estimating the phase rotation of a signal of interest from first and second signals, the method comprising:
   a) determining whether a predetermined relationship exists between the magnitudes of the first and second signals;
   b) if the predetermined relationship is determined to exist, moving to step g);
   c) if the predetermined relationship does not exist, multiplying the first signal by a predetermined scaling factor to produce a multiplied signal;
   d) determining whether the predetermined relationship exists between the multiplied signal and the second signal;
   e) if the predetermined relationship does not exist between the multiplied signal and the second signal, multiplying the multiplied signal by the predetermined scaling factor;

f) repeating steps d) and e) until the predetermined relationship exists;

g) determining on how many occasions a signal was multiplied before the predetermined relationship came to exist; and h) estimating the phase rotation using the number of occasions of multiplication so determined.

2. A method according to claim 1, wherein the predetermined relationship exists when the magnitude of the first signal is greater than, or is greater than or equal to, the magnitude of the second signal.

3. A method according to claim 1, wherein the first and second signals are provided by:

mixing a signal having a known data sequence with a de-spreading code;

accumulating the mixed signal over a first period of time to provide a first complex value;

accumulating the mixed signal over a second period of time, separated from the first period of time, to provide a second complex value;

multiplying the first complex value by the conjugate of the second complex value;

taking the real part of the multiplication result as the second signal; and taking the imaginary part of the multiplication result as the first signal.

4. A method according to claim 1, further comprising determining the quadrant of the phase of the signal of interest by examining the signs of the first and second signals.

5. A method according to claim 1, further comprising adjusting the separation of the first and second periods of time.

6. A method according to claim 1, further comprising upscaling the second signal, and upscaling the first signal or, if the first signal was multiplied before the predetermined relationship existed, upscaling the multiplied signal which resulted in the predetermined relationship existing.

7. Apparatus for estimating the phase rotation of a signal of interest from first and second signals, the apparatus comprising:

means for determining whether a predetermined relationship exists between the magnitudes of the first and second signals;

means for, if the predetermined relationship does not exist, multiplying the first signal by a predetermined scaling factor to produce a multiplied signal;

means for determining whether the predetermined relationship exists between the multiplied signal and the second signal;

means for, if the predetermined relationship does not exist between the multiplied signal and the second signal, repeatedly multiplying the multiplied signal by the predetermined scaling factor until the predetermined relationship exists;

means for determining on how many occasions a signal was multiplied before the predetermined relationship came to exist; and means responsive to the number of occasions of multiplication so determined for estimating the phase rotation.

8. Apparatus according to claim 7, wherein the means for determining whether predetermined relationship exists comprises means for detecting when the magnitude of the first signal is greater than, or is greater than or equal to, the magnitude of the second signal.

9. Apparatus according to claim 7, further comprising means to provide the first and second signals, the means comprising:

a mixer for mixing a signal having a known data sequence with a de-spreading code;

an accumulator for accumulating the mixed signal over a first period of time to provide a first complex value and for accumulating the mixed signal over a second period of time, separated from the first period of time, to provide a second complex value;

means for multiplying the first complex value by the conjugate of the second complex value;

means for taking the real part of the multiplication result as the second signal; and means for taking the imaginary part of the multiplication result as the first signal.

10. Apparatus according to claim 7, further comprising means for examining the signs of the first and second signals to determine the quadrant of the phase of the signal of interest.

11. Apparatus according to claim 7, further comprising means for adjusting the separation of the first and second periods of time.

12. Apparatus according to claim 7, further comprising means for upscaling the second signal, and means for upscaling the first signal or, if it is determined that the first signal was multiplied before the predetermined relationship existed, upscaling the multiplied signal which resulted in the predetermined relationship existing.

* * * * *